Aug. 7, 1928.
M. W. WYSONG
1,679,702
CORE FOR FLASH BUTT WELDING
Filed Feb. 18, 1926
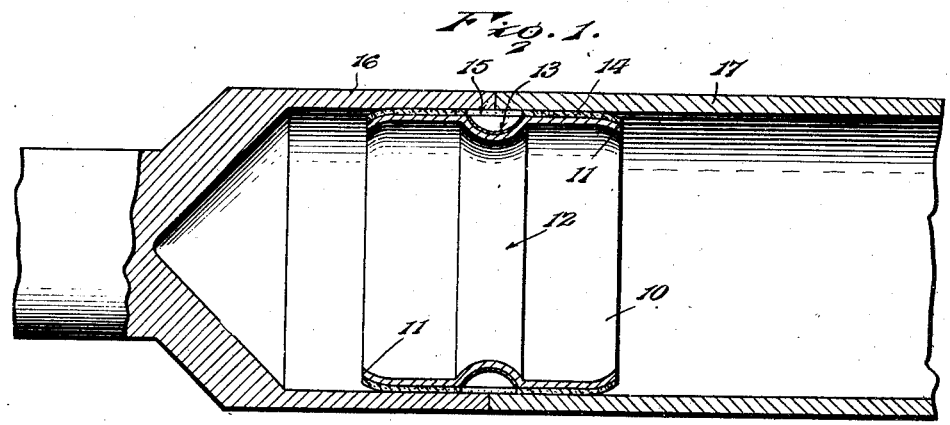
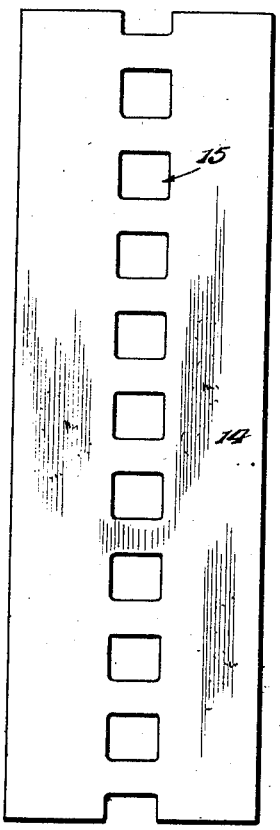
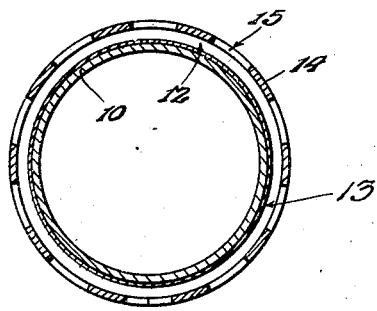
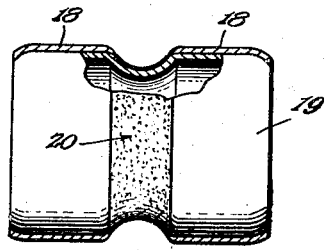
Inventor
M. W. Wysong.
By Lacy & Lacy, Attorneys Patented Aug. 7, 1928.

1,679,702

UNITED STATES PATENT OFFICE.

MAXWELL W. WYSONG, OF NORTH PLAINFIELD, NEW JERSEY, ASSIGNOR OF ONE-HALF TO HERBERT C. POOLE, OF NEWARK, NEW JERSEY.

CORE FOR FLASH BUTT WELDING.

Application filed February 18, 1926. Serial No. 89,150.

This invention relates to an improved core for flash butt-welding as practised in accordance with the process set forth in my co-pending application for patent for flash butt-welded joint and process of welding same, filed February 18, 1926, Serial No. 89,151.

The invention seeks, among other objects, to provide a core which will, incident to the welding of butting members, effectively function to mold an internal reinforcing bead at the joint between the members and retain the molten metal to prevent the subsequent formation of any loose metal fragments within the members.

The invention seeks, as a further object, to provide a core which will be effectively insulated.

And the invention seeks, as a still further object, to provide a core which will be simple in construction and which may be inexpensively produced.

Other objects of the invention not specifically mentioned in the foregoing will appear during the course of the following description.

In the accompanying drawings:

Figure 1 is a longitudinal sectional view showing my improved core in position within butting shaft members, ready for the welding operation.

Figure 2 is a transverse sectional view taken medially through the core.

Figure 3 is a plan view of the insulating strip from which the insulating jacket of the core is formed.

Figure 4 is an elevation showing a slightly modified form of core, the insulating bands of the core being illustrated in section.

In carrying the invention into effect, I employ a cylindrical metal shell which is preferably of copper and, as shown in Figure 1, the shell is contracted or reduced in diameter at its ends, as indicated at 11, the end margins of the shell being turned inwardly. Pressed from the shell medially thereof is an encircling substantially semi-cylindrical groove 12, and covering the wall of this groove is a borax flux coating 13 which, before the core is actually used in a welding operation, is allowed to thoroughly dry. Encircling the shell is a refractory insulating band or jacket 14. This jacket is preferably formed from a strip of asbestos of the character shown in Figure 3, and said strip is adhesively secured to the shell, preferably by ordinary flour paste. Formed in the insulating strip is a series of spaced openings 15 which, when the strip is applied to provide the jacket, are centered with respect to the groove 12 of the shell. Except at these openings, the jacket completely covers the shell throughout its circumference and from end to end thereof.

In Figure 1 of the drawings, I have shown the improved core in position within the butting ends of shaft members 16 and 17 which are to be welded. As will be observed, the groove 12 of the shell 10 of the core is centered with respect to the meeting end edges of said members and accordingly, as an electric current is passed through said members for fusing the ends thereof, the molten metal will flow through the openings 15 of the jacket 14 into the groove 12 to be molded by the core into an annular reinforcing bead at the welded joint between the members. The purpose of the insulating jacket 14, therefore, becomes clear. As will be seen, this jacket will insulate the shell of the core from the members 16 and 17 and prevent bridging of the circuit from one member to the other through the shell. Furthermore, since the ends of the shell are contracted, the end edges of the shell are displaced inwardly with respect to the walls of the members 16 and 17 to prevent arcing of the current from either member to the shell. Preferably, the core is of a major diameter to quite snugly fit within the members 16 and 17 so that the molten metal flowing into the groove 12 will be retained in said groove. Accordingly, the formation of drops or strings of molten metal within the members 16 and 17, to later cool as loose metal fragments or particles of metal within said members, after the welding operation is completed, will be prevented. Thus, since the core will prevent the flow of an excess of molten metal into the members 16 and 17 at the meeting ends thereof, the strength of the electric current flowing through the members may be regulated to quickly fuse the meeting ends of the members so that the welding operation may be expeditiously accomplished while but very little endwise pressure upon the members will be required. As the molten metal flows into the groove 12 of the shell 10 of the core, such metal is, due to the presence of the flux coating 13, caused to amalgamate with the shell so that the shell is thus integrally united with the formed bead for permanently and rigidly anchoring the core within the shaft members.

In Figure 4 of the drawings, I have illustrated a slightly modified form of core which is more particularly designed for use in connection with the welding of small shaft members or the like. In any instance where the core is relatively large in diameter, as illustrated in Figures 1 and 2 of the drawings, a single refractory strip is, as previously described, employed to form the insulating jacket. However, in the modified structure, separate refractory bands 18 are employed. These bands are preferably of asbestos and are adhesively secured to the end portions of the shell 19, as in the prior embodiment of the invention. The shell 19 is identical with the shell 10 with the exception that it is of smaller diameter and, of course, the bands 18 completely encircle the end portions of the shell. Furthermore, as will be observed, the side margins of the bands are turned inwardly to overlie the contracted ends of the shell as well as to partially overlie the side walls of the groove 20 of the shell. The separate bands thus provide an effective insulating jacket for the shell. Otherwise, this modified structure is identical with the prior embodiment of the invention and further description is accordingly believed unnecessary.

Having thus described the invention, what I claim is:

1. A core for butt-welding including a core member having an external fused metal receiving cavity, and means for insulating said member externally.

2. A core for butt-welding including a core member having an external fused metal molding cavity, and external insulating means carried by said member.

3. A core for butt-welding including a core member having an external fused metal molding groove, and external insulating means carried by said member.

4. A core for butt-welding including a shell having an external encircling fused metal receiving groove, and external insulating means carried by the shell.

5. A core for butt-welding including a shell having an external encircling fused metal receiving groove, external insulating means carried by the shell, and a flux coating the wall of said groove.

6. A core for butt-welding including a metal shell having an external encircling fused metal receiving groove, and an external refractory insulating jacket carried by the shell.

7. A core for butt-welding including a metal shell having an external encircling fused metal receiving groove and being contracted at its ends, and a refractory insulating jacket carried by the shell and overlying the contracted ends thereof.

8. A core for butt-welding including a shell having an external fused metal receiving cavity and a refractory insulating band surrounding the shell.

9. A core for butt-welding including a core member having an external metal receiving cavity, and means for insulating said member externally and provided with an opening at said cavity.

10. A core for butt-welding including a shell having an external fused metal receiving groove, and an external insulating jacket carried by the shell and provided with spaced openings at said groove.

11. A core for butt-welding comprising a metallic shell having a portion shaped externally to receive fused metal, and a refractory and insulating medium upon the exterior of the shell having openings therein communicating with the metal receiving portion of the shell.

In testimony whereof I affix my signature.

MAXWELL W. WYSONG. [L. S.]